United States Patent
Harris (10) Patent No.: US 11,146,561 B2
(45) Date of Patent: *Oct. 12, 2021

(54) HANDLING ENCODED INFORMATION

(71) Applicant: ENSYGNIA IP LTD (EIPL), London (GB)

(72) Inventor: Richard H. Harris, Hampshire (GB)

(73) Assignee: ENSYGNIA IP LTD (EIPL), London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/734,984

(22) Filed: Jan. 6, 2020

(65) Prior Publication Data

US 2020/0396224 A1    Dec. 17, 2020

Related U.S. Application Data

(63) Continuation of application No. 15/450,837, filed on Mar. 6, 2017, now Pat. No. 10,530,769, which is a
(Continued)

(30) Foreign Application Priority Data

Nov. 25, 2010   (GB) ..................................... 1020025

(51) Int. Cl.
*H04L 9/32*        (2006.01)
*G06F 21/36*       (2013.01)
(Continued)

(52) U.S. Cl.
CPC .......... *H04L 63/10* (2013.01); *G06F 16/9554* (2019.01); *G06F 21/34* (2013.01);
(Continued)

(58) Field of Classification Search
None
See application file for complete search history.

(56) References Cited

U.S. PATENT DOCUMENTS 6,289,328 B2 *   9/2001   Shaffer .............. G01N 33/0034
                                                           706/19
7,379,921 B1     5/2008   Kiliccote
(Continued)

FOREIGN PATENT DOCUMENTS

AT              524897          9/2011
CN        200610141150.X       10/2006
(Continued)

OTHER PUBLICATIONS

Alapetite, Alexandre, "Dynamic 2D-barcodes for multi-device Web session migration including mobile phones," Personal and Ubiquitous Computing, Apr. 2, 2019, pp. 1-13.
(Continued)

*Primary Examiner* — Michael Pyzocha
(74) *Attorney, Agent, or Firm* — McDonnell Boehnen Hulbert & Berghoff LLP (57) ABSTRACT

A method comprises a portable device obtaining a graphical encoded information item which is displayed on a display of a computing apparatus, decoding the encoded information from the encoded information item, and transmitting a first message to first server apparatus, the first message including the decoded information and a first identifier identifying the device or a user of the device, wherein the decoded information includes an apparatus identification information item for allowing identification of the computing apparatus, and the first server apparatus receiving the first message from the device, establishing the identity of the user of the device, wherein establishing the identity of the user comprises using the first identifier to determine if the user is registered with the first server apparatus in response to establishing the identity of the user, authorising the user to access a service, and providing the service to the user via the computing apparatus using the apparatus identification information item or sending a second message to a second server
(Continued)

apparatus, the second message including the apparatus identification information item and indicating that the user is authorised to access the service provided by the second server apparatus, the second server apparatus responding to receipt of the second message by providing the service to the user via the computing apparatus using the apparatus identification information item.

14 Claims, 3 Drawing Sheets

Related U.S. Application Data continuation of application No. 13/989,519, filed as application No. PCT/GB2011/052320 on Nov. 25, 2011, now Pat. No. 9,614,849.

(51) Int. Cl.
    H04L 29/06      (2006.01)
    G06F 16/955     (2019.01)
    G06F 21/34      (2013.01)
    G06F 21/35      (2013.01)
    G06F 21/43      (2013.01)
    G06Q 20/32      (2012.01)
    G06Q 20/40      (2012.01)
    H04W 12/77      (2021.01)

(52) U.S. Cl.
    CPC ............ *G06F 21/35* (2013.01); *G06F 21/36* (2013.01); *G06F 21/43* (2013.01); *G06Q 20/3276* (2013.01); *G06Q 20/401* (2013.01); *G06Q 20/407* (2013.01); *H04L 9/32* (2013.01); *H04L 63/08* (2013.01); *H04L 63/083* (2013.01); *H04L 63/0853* (2013.01); *H04L 63/18* (2013.01); *H04L 2463/082* (2013.01); *H04W 12/77* (2021.01)

(56) References Cited

U.S. PATENT DOCUMENTS

| | | | | |
|---|---|---|---|---|
| 7,483,858 | B2* | 1/2009 | Foran | G06Q 20/363 |
| | | | | 705/39 |
| 8,010,128 | B2 | 8/2011 | Silverbrook et al. | |
| 8,256,664 | B1* | 9/2012 | Balfanz | G06F 21/43 |
| | | | | 235/375 |
| 9,208,293 | B1* | 12/2015 | Zhu | H04W 4/029 |
| 2005/0125301 | A1* | 6/2005 | Muni | G06Q 20/208 |
| | | | | 705/23 |
| 2007/0220597 | A1 | 9/2007 | Ishida | |
| 2009/0241175 | A1* | 9/2009 | Trandal | H04L 63/0853 |
| | | | | 726/7 |
| 2009/0249475 | A1* | 10/2009 | Ohaka | H04L 63/18 |
| | | | | 726/16 |
| 2009/0283589 | A1* | 11/2009 | Moore | G06Q 20/042 |
| | | | | 235/382 |
| 2009/0288159 | A1* | 11/2009 | Husemann | H04L 9/3271 |
| | | | | 726/16 |
| 2010/0001058 | A1* | 1/2010 | Grovit | G06Q 40/12 |
| | | | | 235/375 |
| 2010/0070759 | A1* | 3/2010 | Leon Cobos | G06Q 20/4097 |
| | | | | 713/155 |
| 2010/0242103 | A1* | 9/2010 | Richardson | H04W 48/10 |
| | | | | 726/7 |
| 2010/0257366 | A1* | 10/2010 | Leclercq | G06F 21/35 |
| | | | | 713/173 |
| 2010/0273527 | A1* | 10/2010 | Silverbrook | H04M 1/72561 |
| | | | | 455/557 |
| 2010/0275010 | A1* | 10/2010 | Ghirardi | H04L 63/0853 |
| | | | | 713/155 |
| 2011/0055547 | A1* | 3/2011 | Lee | H04L 63/18 |
| | | | | 713/150 |
| 2011/0210171 | A1* | 9/2011 | Brown | H04L 63/083 |
| | | | | 235/382 |
| 2011/0241823 | A1* | 10/2011 | Anders | H04W 12/02 |
| | | | | 340/5.8 |
| 2012/0102558 | A1* | 4/2012 | Muraki | H04W 12/0602 |
| | | | | 726/7 |
| 2012/0130775 | A1* | 5/2012 | Bogaard | G07B 15/02 |
| | | | | 705/13 |
| 2012/0266224 | A1* | 10/2012 | Gruschka | G06F 21/35 |
| | | | | 726/7 |
| 2013/0008954 | A1* | 1/2013 | Rathus | G06Q 30/02 |
| | | | | 235/380 |

FOREIGN PATENT DOCUMENTS

| | | |
|---|---|---|
| CN | 101055608 | 10/2007 |
| EP | 1197046 | 4/2002 |
| EP | 1264259 | 2/2007 |
| EP | 2073160 | 6/2009 |
| EP | 2166697 | 3/2010 |
| EP | 2552142 | 1/2013 |
| ES | 2373489 | 2/2012 |
| FR | 2940580 | 6/2010 |
| GB | 1020025.1 | 1/2012 |
| GB | 2481663 | 1/2012 |
| GB | 1205664.4 | 9/2012 |
| GB | 2489332 | 9/2012 |
| JP | 2005228157 | 8/2005 |
| JP | 2006244418 | 9/2006 |
| JP | 2008217277 | 9/2008 |
| JP | 2008226200 | 9/2009 |
| WO | 2001/003386 | 1/2001 |
| WO | 2006/102848 | 10/2006 |
| WO | 2008/040949 | 4/2008 |
| WO | 2009/116954 | 9/2009 |
| WO | 2012/069845 | 2/2012 |
| WO | 2013/110407 | 8/2013 |

OTHER PUBLICATIONS

Australian Government—IP Australia, First Examination Report dated Jul. 30, 2015, in connection with Australian Patent Application No. AU2011333497, 3 pages.

Chilean Patent Office, Office Action (and English translation) dated Feb. 6, 2015, in connection with Chilean Patent Application No. 1484-13, 14 pages.

Chinese Patent Office, First Office Action (and English Translation) dated Nov. 4, 2015, issued in connection with Chinese Patent Application No. CN201180064866.3, 31 pages.

Chinese Patent Office, Second Office Action (and English Translation) dated Jan. 4, 2016, issued in connection with Chinese Patent Application No. CN201180064866.3, 7 pages.

Chinese Patent Office, Office Action (and English Translation) dated Sep. 27, 2018, issued in connection with Chinese Patent Application No. 201610643502.5, 9 pages.

Colombian Patent Office, Colombia Resolution No. 52540 (and English Translation) dated Aug. 26, 2015, issued in connection with Colombian Patent Application No. PCT/13-149828, 22 pages.

Dawson, Greg, "LogMote Protect Your Passwords from Keylogging and Phishing Scams," www.apperaver.com/logmote-passwords, Jan. 2, 2013, 6 pages.

Dodson et al., "Secure, Consumer-Friendly Web Authentication and Payments with a Phone," Mobicase 2010, Lecture Notes of the Institute for Computer Sciences, Social Information and Telecommunications Engineering (LNICST), Jan. 6, 2010, pp. 17-38, vol. 76.

European Patent Office, Third Party Observation dated Feb. 5, 2015, issued in connection with European Patent Application No. EP11808891.9, 24 pages.

Fedora Forum, blog post, "QR Code Based Password Reader!" Feb. 13, 2009, 4 pages.

(56) References Cited

OTHER PUBLICATIONS

International Searching Authority, International Preliminary Report on Patentability dated May 28, 2013, issued in connection with International Patent Application No. PCT/GB2011/052320, 7 pages.
Israeli Patent Office, Office Action (and English translation) dated Oct. 28, 2018, issued in connection with Israeli Patent Application No. 226539, 4 pages.
Japanese Patent Office, First Office Action (with English translation) dated Dec. 1, 2015, issued in connection with Japanese Patent Application No. 2013-540436, 7 pages.
Logmote: "Use your smartphone for online authentication," http://www_makesuseof_conn/tag/lognote-use-your-smartphone-for-online-authentication, 3 pages.
Mizuno et al., "Authentication Using Multiple Communication Channels," Proceeding DIM '05, Proceedings of the 2005 Workshop on Digital identity managment, 2005, pp. 54-62.
Raconteur—"Future of Payments," Publisher: Will Brookes, Jun. 23, 2013, 20 pages.
Russian Patent Office, Office Action (with English translation) dated Nov. 18, 2015, issued in connection with Russian Patent Application No. 1310821, 8 pages.
Stamberg et al., "QR-TAN: Secure Mobile Transaction Authentication," 2009 International Conference on Availability, Reliability and Security, 2009, pp. 578-583.
Takamizawa et al., "A Web Authentication System Using Location Information for Mobile Telephones," Proceedings of the the IASTED International Conference, Web-based Education (WBE 2009), Mar. 16-18, 2009, Phuket, Thailand, 2009, pp. 31-36.
Tanaka et al., "A Method and its Usability for User Authentication by Utilizing a Matrix Code Reader on Mobile," Information Security Applications, WISA 2006. Lecture Notes in Computer Science, 2006, vol. 4298 (abstract only).

\* cited by examiner

HANDLING ENCODED INFORMATION

CROSS-REFERENCE TO RELATED APPLICATION

This application is a continuation application of U.S. patent application Ser. No. 15/450,837, filed Mar. 6, 2017, which is a continuation application of U.S. patent application Ser. No. 13/989,519, filed Aug. 15, 2013, which is a U.S. National Stage Application under 35 U.S.C. Section 371 of International Patent Application No. PCT/GB2011/052320, filed Nov. 25, 2011, which claims benefit to British Application No. 1020025.1, filed Nov. 25, 2010, the entirety of each application being incorporated herein by reference.

FIELD OF THE INVENTION

The invention relates to the handling of encoded information

BACKGROUND TO THE INVENTION

Identity cloning is an increasingly common phenomenon. Fraudsters use a wide variety of mechanisms to in order to illegally elicit personal information such as usernames, passwords, dates of birth and addresses with a view to cloning identities. One such mechanism is where a fraudster provides a spoof (or clone) of a website, which to an unsuspecting user appears identical to the original. Believing that the website is the original, the user provides personal information, such as login details or credit card details, which are recorded by the fraudster. A more sophisticated approach is a "man-in-the-middle attack" in which a fraudster provides the clone website and records the personal information, but also passes the personal information to the real website, which logs the user in as normal. In this way, the user does not notice anything different and the fraudster is able to obtain the personal information without alerting the user. This invention was made with a view to preventing these and other similar types of fraudulent activity.

SUMMARY OF THE INVENTION

According to a first aspect, this specification describes a method comprising a device obtaining an encoded information item, decoding the encoded information from the encoded information item, and transmitting a first message to first server apparatus, the first message including the decoded information and a first identifier identifying the device or a user of the device; and the first server apparatus receiving the first message from the device, using the first identifier to establish the identity of the user of the device, and in response to establishing the identity of the user, performing an action based on the decoded information.

The encoded information may comprise a third identifier, the third identifier identifying the first server apparatus, and the first message may be transmitted to the first server apparatus based on the third identifier.

According to a second aspect, this specification describes a method comprising a device obtaining an encoded information item, and transmitting a first message to first server apparatus, the first message including the encoded information item and a first identifier identifying the device or a user of the device, and the first server apparatus receiving the first message from the device, decoding the encoded information from the encoded information item, using the first identifier to establish the identity of the user of the device, and in response to establishing the identity of the user, performing an action based on the decoded information.

In the first or second aspects, the decoded information may comprise a verification information item and the method may further comprise the first server apparatus comparing the verification information item with a reference verification item, if there is identity between the verification information item and the reference verification item, performing the action based on the decoded information, and if there is not identity between the verification information item and the reference verification item aborting the method before prior to performing the action based on the decoded information.

The decoded information may include an apparatus identification information item for allowing identification of computing apparatus on, by, or near to which the encoded information object is provided.

Performing the action may comprise sending a signal to the computing apparatus based on the apparatus identification information item. Performing the action may also comprise allowing the user to access a service, wherein the signal comprises an indication that the user is allowed access to the service.

The encoded information may comprise a second identifier, the second identifier identifying second server apparatus and performing an action based on the decoded information may comprise sending a second message to the second server, the second message including authorisation information relating to the identified user. The decoded information may include an apparatus identification information item for allowing identification of computing apparatus on, by, or near to which the encoded information object is provided, the second message may include the apparatus identification information item, and the method may further comprise the second server apparatus responding to receipt of the second message by sending a signal to the computing apparatus based on the apparatus identification information item. The second server apparatus may respond to receipt of the second message by allowing the user to access a service, and the signal may comprise an indication that the user is allowed access to the service.

According to a third aspect, this specification describes a system comprising a device configured to obtain an encoded information item, to decode the encoded information from the encoded information item, and to transmit a first message to first server apparatus, the first message including the decoded information and a first identifier identifying the device or a user of the device, and first server apparatus configured to receive the first message from the device, to use the first identifier to establish the identity of the user of the device, and in response to establishing the identity of the user, to perform an action based on the decoded information.

According a fourth aspect, this specification describes a system comprising a device configured to obtain an encoded information item, and to transmit a first message to first server apparatus, the first message including the encoded information item and a first identifier identifying the device or a user of the device, and first server apparatus configured to receive the first message from the device, to decode the encoded information from the encoded information item, to use the first identifier to establish the identity of the user of the device, and in response to establishing the identity of the user, to perform an action based on the decoded information.

The device and the first server apparatus may be configured as described above by way of one or more processors operating under control of computer-readable code, optionally stored on one or more memory. The one or more memory may comprise one or more non-transitory memory media.

This specification also describes a method comprising a portable device obtaining a graphical encoded information item which is displayed on a display of a computing apparatus, decoding the encoded information from the encoded information item; and transmitting a first message to first server apparatus, the first message including the decoded information and a first identifier identifying the device or a user of the device, wherein the decoded information includes an apparatus identification information item for allowing identification of the computing apparatus, and the first server apparatus receiving the first message from the device, establishing the identity of the user of the device, wherein establishing the identity of the user comprises using the first identifier to determine if the user is registered with the first server apparatus, in response to establishing the identity of the user, authorising the user to access a service, and providing the service to the user via the computing apparatus using the apparatus identification information item, or sending a second message to a second server apparatus, the second message including the apparatus identification information item and indicating that the user is authorised to access the service provided by the second server apparatus, the second server apparatus responding to receipt of the second message by providing the service to the user via the computing apparatus using the apparatus identification information item.

This specification also describes method comprising a portable device obtaining a graphical encoded information item which is displayed on a display of a computing apparatus and transmitting a first message to first server apparatus, the first message including the encoded information item and a first identifier identifying the device or a user of the device, and the first server apparatus receiving the first message from the device, decoding the encoded information from the encoded information item, wherein the decoded information includes an apparatus identification information item for allowing identification of the computing apparatus, establishing the identity of the user of the device, wherein establishing the identity of the user comprises using the first identifier to determine if the user is registered with the first server apparatus, in response to establishing the identity of the user, authorising the user to access a service, and providing the service to the user via the computing apparatus using the apparatus identification information item or sending a second message to a second server apparatus, the second message including the apparatus identification information item and indicating that the user is authorised to access the service provided by the second server apparatus, the second server apparatus responding to receipt of the second message by providing the service to the user via the computing apparatus using the apparatus identification information item.

The specification also describes systems for performing the above-described methods.

This specification also describes computer-readable code, optionally stored on a non-transitory memory medium, which when executed by computing apparatus, causes the computing apparatus to perform any of the above methods.

BRIEF DESCRIPTION OF THE FIGURES

For a more complete understanding of example embodiments of the present invention, reference is now made to the following description taken in connection with the accompanying drawings in which.

DETAILED DESCRIPTION OF EMBODIMENTS OF THE INVENTION

In the drawings and the following description, like reference numerals refer to like elements.

Figure 1:
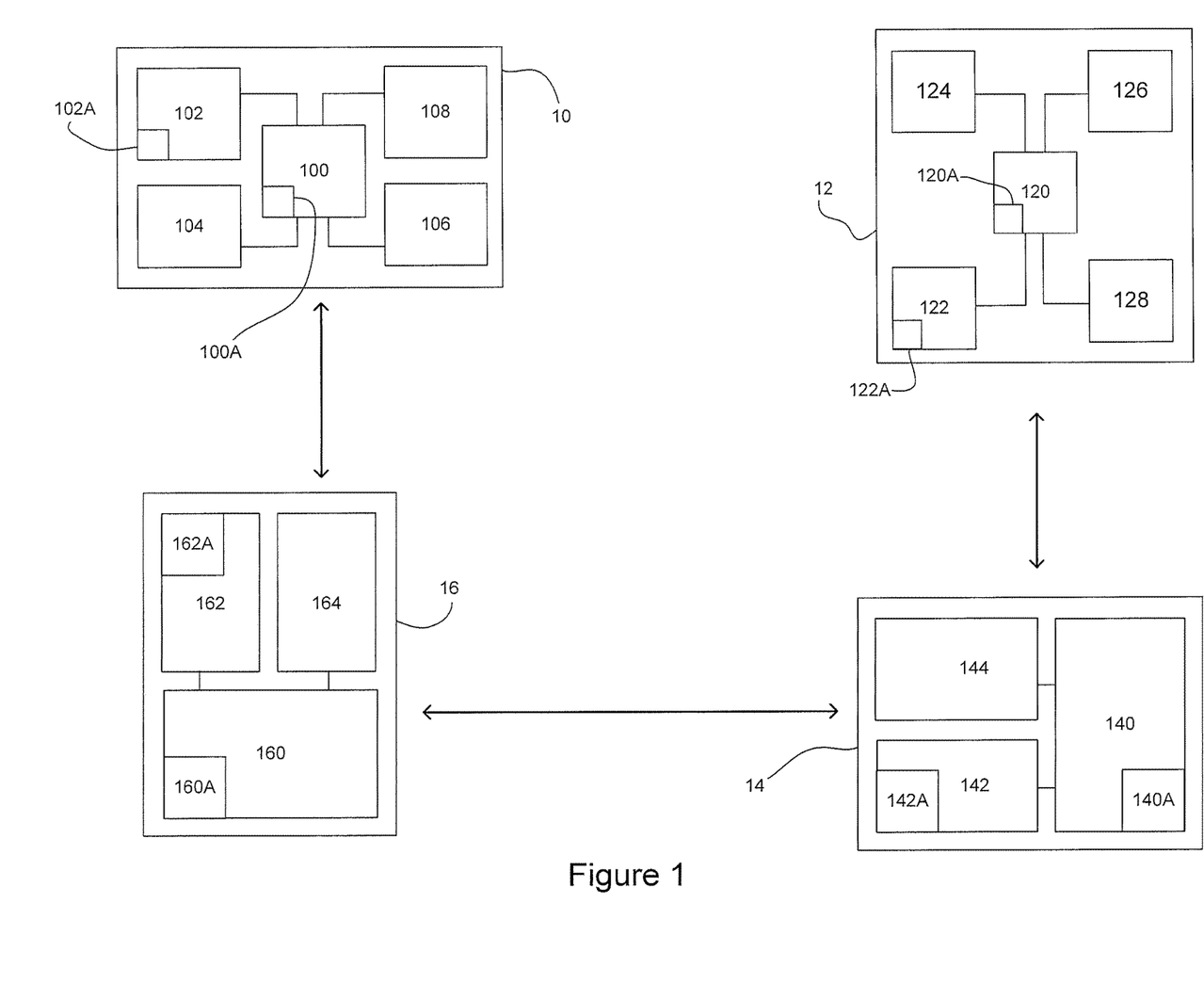
FIG. 1 is a schematic illustration of a system in which embodiments of the invention can be implemented.

FIG. 1 is a schematic illustration of a system in which embodiments of the invention can be implemented.

The system 1 comprises computing apparatus 10, a mobile device 12, a first server apparatus 14 and a second server apparatus 16. The first and second server apparatuses 14, 16 may be located in "the cloud".

The mobile device 12 is operable to communicate wirelessly with the first server apparatus 14. Wireless communication with the first server apparatus is carried out via a transceiver 124. The communication with the first server apparatus may be via a telephone network or a data network. The mobile device 12 comprises a controller 120 and one or more memory 122. The controller 120 comprises at least one processor 120A. The controller 120 may also comprise at least one application specific integrated circuit (ASIC) not shown. The at least one memory 122 may comprise any suitable type of fixed or removable memory medium, such as but not limited to ROM, RAM or EEPROM. The at least one memory 120 has stored thereon computer-readable instructions 122A. The controller 120 is operable to read the computer-readable instructions 122A and operate under the control of the computer-readable instructions 122A. The controller 20 is operable to control the other components of the mobile device 12.

The mobile device 12 comprises obtaining means 124 for obtaining encoded information items which are external to the device 12. The obtaining means 124 may comprise a camera or a scanner for obtaining graphical information or any other type of means suitable for obtaining encoded information items.

The mobile device 12 also comprises a user interface 126 for receiving user inputs. The mobile device may also comprise a display 128. In this example, the user interface 126 and display 128 form a touchscreen. It will be appreciated however, that the user interface 126 may be of any type. For example, it may comprise one or more or a hardware key or keys, a trackball, a touchpad, a scroll wheel etc.

The first server apparatus 14 is operable to communicate with the mobile device 12. The first server apparatus 14 is operable also to communicate with the second server apparatus 16. The first server apparatus 14 comprises a controller 140 and one or more memory 142. The controller 140 comprises at least one processor 140A. The controller 140 may also comprise at least one application specific integrated circuit (ASIC) not shown. The at least one memory 142 may comprise any suitable type of fixed or removable memory medium, such as but not limited to ROM, RAM or EEPROM. The at least one memory 140 has stored thereon computer-readable instructions 142A. The controller 140 is operable to read the computer-readable instructions 142A and to operate under their control.

The first server apparatus 14 comprises also one or more transceivers 146 for communicating with the mobile device 12 and the second server apparatus 16. The communication between the first and second server apparatuses 14, 16 may be carried out in any suitable manner.

The first server apparatus 14 may be located at a single location and may comprise one or more separate devices or machines. Alternatively, the first server apparatus 14 may be distributed over a plurality of locations.

The second server apparatus 16 is operable to communicate with the computing apparatus 10 and the first server apparatus 14 in any suitable manner. The second server apparatus 16 comprises one or more transceivers 164 for communicating with the computing apparatus 10 and the first server apparatus 14. The second server apparatus 16 comprises a controller 160 and one or more memory 162. The controller 160 comprises at least one processor 160A. The controller 160 may also comprise at least one application specific integrated circuit (ASIC) not shown. The at least one memory 162 may comprise any suitable type of fixed or removable memory medium, such as but not limited to ROM, RAM or EEPROM. The at least one memory 160 has stored thereon computer-readable instructions 162A. The controller 160 is operable to read the computer-readable instructions 162A and to operate under their control. The controller 160 is operable also under the control of the computer-readable code to control the other components of the second server apparatus 16.

The second server apparatus 16 may be located at a single location and may comprise one or more separate devices or machines. Alternatively, the second server apparatus 16 may be distributed over a plurality of locations.

The computing apparatus 10 is operable to receive signals from the second server apparatus 16 via a transceiver 106, to interpret the information contained therein and to display it on a display 104 for consumption by a user. The computing apparatus 10 may also comprise a user interface 108, such as but not limited to a mouse, a touch pad, or a keyboard via which a user input can be received. The computing apparatus 10 comprises a controller 100 and one or more memory 102. The controller 100 comprises at least one processor 100A. The controller 100 may also comprise at least one application specific integrated circuit (ASIC) not shown. The at least one memory 102 may comprise any suitable type of fixed or removable memory medium, such as but not limited to ROM, RAM or EEPROM. The at least one memory 100 has stored thereon computer-readable instructions 102A. The controller 100 is operable to read the computer-readable instructions 102A and to operate under their control. The controller 100 is operable under the control of the computer-readable code to control the other components, such as the display 104 and the transceiver 106.

Figure 2:
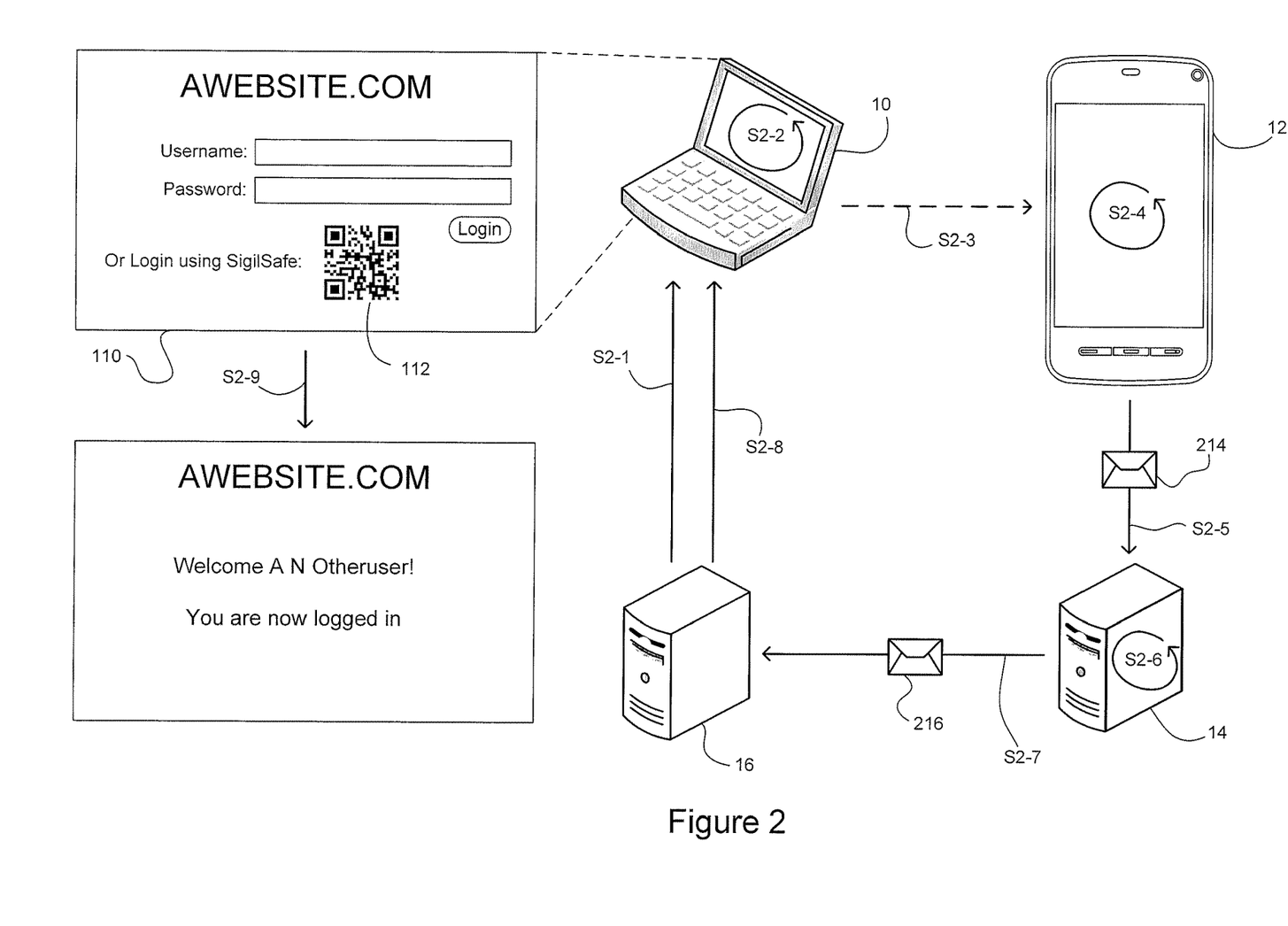
FIG. 2 is a schematic illustration of a method according to embodiments of the invention.

FIG. 2 is a schematic illustration of a method according to a first embodiment of the invention.

In step S2-1, the second server apparatus 16, which is in this example a web server, provides the computing apparatus 10 with information. In this example, the information is web page information. The provision of the web page information may be in response to a request received from the computing apparatus 10 following receipt at the computing apparatus 10 of a user input.

In step S2-2, the computing apparatus receives and displays the web page information. In this example, the webpage information comprises a "Login" page 110. The "Login" page 110 contains fields into which a user is able to provide details, in this example a username and password. The second server apparatus 16 is operable to verify these details and subsequently to allow the user to access services and content provided within the web page.

The web page comprises an encoded information item 112 which contains encoded information. In this example, the encoded information item 112 is a graphical object (GO) (which is depicted in the Figures as a "quick response" (QR) code). It will be appreciated that various other types of graphical object may instead be used. Examples of such are barcodes, fractal patterns and moving images.

The GO 112 comprises a GO address information item. The GO address information item comprises an address of the computer apparatus 10 on or by which the GO 112 is displayed. The GO address information item may comprise a code, for example a numeric code or an alpha-numeric code, which identifies a route or a number of routes to the device. Examples of such codes are an IP address, a telephone number, a domain name and a Blackberry® PIN.

According to other embodiments, the GO address information item may not comprise address information per se, but may instead comprise information which allows the address of the apparatus on which the GO 112 is displayed to be determined. This may include for example a code or number, such as but not limited to a hardware serial number, which can be used to determine the route to the computing apparatus (e.g. the IP address) from a look-up table.

In this example, the GO 112 also comprises a second server identification (SSID) information item for allowing the second server apparatus 16 to be identified. The SSID information item may comprise an address of the second server apparatus 16. Alternatively, the SSID information item may comprise information allowing the application of the mobile device 12 or the first server apparatus 14 to be determined, for example from a look up table.

The GO 112 may also comprise a first server identification (FSID) information item for allowing the mobile device 12 to identify the first server apparatus 14 with which the GO 112 is associated. The FSID information item may comprise an address of the first server apparatus 14 or may instead comprise a data item such as a code which allows an application (which is described in more detail below) stored on the mobile device 12 to retrieve the address of the first server apparatus 14 from memory 122.

The GO 112 may also comprise a verification information item or items for allowing verification of the graphical object to ensure it is not a fraud.

The information required to display the GO 112 may be generated by the second server apparatus 16. Alternatively, part of the information of the GO 112, such as the SSID and the FSID information items, may be generated by the second server apparatus 16 or the first server apparatus 14, and other information, such as the GO address information item, may be generated by the computing apparatus 10. The verification information item or items may be generated by the second server apparatus 16, in which case a copy the verification item or items is passed to, and stored in the memory 142 of, the first server apparatus 14. Alternatively, the verification item or items may be generated by the first server apparatus 14 and passed to the computing apparatus 10 via the second server apparatus 16.

According to some embodiments, the GO 112 may be displayed by computer program code embedded within the web page. Alternatively, the GO 112 may be displayed by computer program code stored on the computing apparatus 10, for example, during a registration process. The computer program code that is stored on the computer apparatus 10, and which generates the GO 112, may, when executed by the controller 100, be in direct communication with the second server apparatus 16. The computer program code may be configured such that the GO 112 is only displayed if direct communication with the second server apparatus 16 can be established. If direct communication is not possible, the GO 112 is not displayed and so cannot be used to access the service. The computer program may determine if it is in direct communication in any suitable way. For example, the IP address of the second server apparatus may be encoded into the computer program and this may be used to determine if communication is with the second server apparatus 16. If a proxy server is between the second server apparatus 16 and the computer apparatus 10, the computer program will recognise that the IP address of the server with which it is communicating (i.e. that of the proxy server) is not the IP address which it expects. The computer program thus determines that it is not in communication with the second server apparatus 16 and does not display the GO 112. Alternatively, the computer program may send request to the second server apparatus for a token, which should be stored in memory of the second server apparatus 16. A proxy server will not have the token in memory and so will not be able to return it to the computer apparatus 10. In this way, the computer apparatus 10 can determine that it is not in direct communication with the second server apparatus 16. Similarly, the computer program may send a request for evidence of a process that is expected to be running on the second server apparatus 16. If the process is not running on the computer at which the request arrives, the computer program determines that it is not in communication with the second server apparatus 16. It will be appreciated that any suitable mechanism, including for example PKI, SSL or DNS pooling, may be used to make this determination.

In step S2-3, the GO 112 is obtained by the mobile device 12. This may involve the user of the device 12 taking a photograph of the GO 112 with a camera of the device 12. Alternatively, any other type of scanner may be used to obtain the GO 112.

In step S2-4, an application decodes the encoded information from the obtained GO 112. The application is a dedicated portion of the computer-readable code 122A stored in the memory 122 of the device, which is able to decode the GO 112 and perform subsequent operations.

The application may have been stored on the mobile device 12 prior to, during or following a registration process between the mobile device 12 and the first server apparatus 14. Either way, the user of the device 12 must register with the first server apparatus 14 to allow the user to utilise the service provided by the first server apparatus 14.

During the registration process, the first server apparatus 14 may store in its memory 142 a user identification (UID) information item relating to the user. This may comprise, for example, a username or user number. Alternatively, the first server apparatus 14 may store device identification (DID) information item relating to the mobile device 12. This DID information item may comprise, for example, a telephone number of the device, an IP address of the device or a device ID code such as a serial number. The DID or the UID information item is stored in association with user registration information, such as a name, address etc. Thus, the DID and the UID information items are usable to allow identification of the user by the first server apparatus 14. A copy of the DID or UID information item is stored in the memory 122 of the mobile device 12.

In step S2-5, subsequent to decoding the obtained GO 112, the application prepares and transmits a first message (in this example, a login request) 314 to the first server apparatus 14.

The first message 214 is sent to the first server apparatus 14 using an address of the first server apparatus 14. The application may be configured to interoperate with just one first server apparatus 14 and thus whenever a GO 112 is obtained, the first message 214 is sent to the same first server apparatus 14 using an address stored in the memory 122. Alternatively, in embodiments in which the GO 112 includes an FSID information item, this may be used to send the first message 214 (either directly, when the FSID information item comprises an address of the first server information item, or indirectly by using the FSID information item to retrieve the address from memory 122). In other alternative embodiments, the first message 214 may be sent to an address selected by the user from a plurality of addresses stored on the device 12.

The first message 214 comprises a first information portion comprising the DID information or the UID information. The first message 214 also comprises a second information portion comprising the GO address information item. The first message 214 may also comprise the SSID information item.

In embodiments in which a verification information item is present in the GO 112, the application may, prior to preparing and sending the first message 214, check the verification information item against a reference information item received from the first server apparatus 14 to determine whether the GO 112 is genuine. If the GO 112 is determined not to be genuine, the application alerts the user of the device 12. If the GO 112 is determined to be genuine, the application prepares and transmits the first message 214 to the server apparatus 14. The reference information against which the verification object is checked may be updated periodically, following receipt of update messages from the first server apparatus 14. According to alternative embodiments, the application may not check the verification information item, but may instead include it in the first message 214.

Prior to preparing and sending the first message, the application may request security information to be entered by the user via the user interface 124 of the device 12 thereby to allow the identity of the user to be verified. The security information may comprise a pin or password, a disguised pin or password, a one-time code which has been sent to the user, a pattern drawn on the device, biometric information (such as face or fingerprint recognition), or any other suitable mechanism by which the identity of the user of the device can be verified.

Next, in step S2-6, the first server apparatus 14 receives the first message 214 (login request) and uses the UID or DID information to establish the identity of the user of the device 12. Establishing the identity of the user comprises using the UID or DID information item to determine whether the user is registered with the first server apparatus 14. Thus, the first server apparatus 14 may check the UID or DID information against information stored in a database of registered users to establish the identity of the user. Subsequent to establishing the identity of the user, the first server apparatus proceeds to step S2-7.

In embodiments in which the first message 214 includes the verification information item, the first server apparatus 14 may, prior to either of steps S2-6 and S2-7, check the verification information item against a reference information item stored in memory 142. If there is identity between the reference information item and the verification item, the first server apparatus 14 proceeds to step S2-6 or S2-7 as appropriate. If there is not identity, the first server may send a message to the mobile device 12 to alert the user that the GO 112 is not genuine and may subsequently abort the method.

In step S2-7, the first server apparatus 14 prepares and sends a second message 216 to the second server apparatus 16. In this example, the second message 216 comprises authorisation information informing the second server apparatus 16 of the identity of the user and that the user is authorised to access the service provided by the second server apparatus 16. The second message 216 also comprises the GO address information item.

The second message 216 is sent on the basis of the SSID information item, either directly when the SSID information item is an address of the second server apparatus 16, or indirectly when the SSID information item enables the first server apparatus to retrieve the address of the second server apparatus 14 from memory 142.

In step S2-8, upon receipt of the second message 216 the second server apparatus 16 performs an action. In this example, the second server apparatus 16 is a web server and thus in response to receiving the authorisation information, the second server apparatus 16 logs the user into their account and subsequently uses the GO address information item to send a signal indicative of such to the computing apparatus 10.

In step S2-9, the computing apparatus 10 displays the received information which indicates that the user is now logged into the website.

According to some embodiments, step S2-6, in which the first server apparatus 14 establishes the identity of the user may include additional steps for verifying the identity of the user. In embodiments in which the mobile device 12 is a mobile telephone, these steps may include the first server apparatus 14 responding to receipt of the first message 214 by initiating a voice call with the mobile device 12. During the voice call, the user is asked to provide information with which their identity can be verified. The information may comprise, for example, a pin number sent via DTMF, or a spoken password or any other information which allows the identity of the user to be established and verified. The information from the user may be compared with information stored in the memory 142 of the first server apparatus 14 and which is associated with the user. The voice call may be conducted using IVR, a human agent, or a combination of the two. In embodiments in which the mobile device 12 does not have telephony capabilities, the steps may be conducted using messages, such as instant messages, sent using internet protocol.

Figure 3:
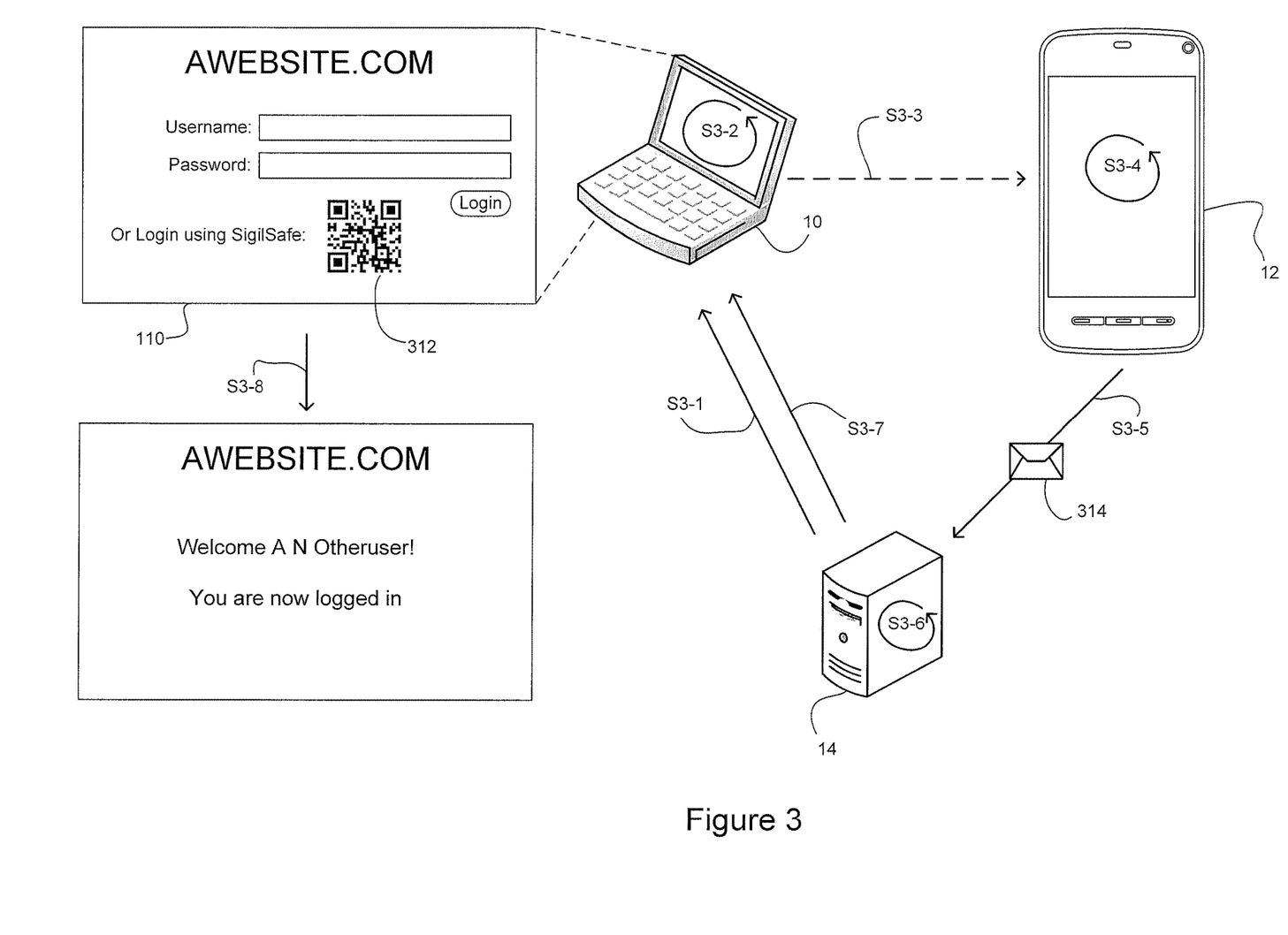
FIG. 3 is a schematic diagram illustration of a system and methods according to alternative embodiments of the invention.

FIG. 3 depicts an alternate system in which the invention can be implemented and illustrates a method according to the invention.

The example of FIG. 3 is similar to that of FIGS. 1 and 2, but differs in that it does not include the second server apparatus 16. Thus, the system comprises the computing apparatus 10, the mobile device 12 and the first server apparatus 14.

In the system 3 of FIG. 3, the first server apparatus 14 is a web server and thus is operable to provide web page information to the computing apparatus 10 to display for consumption by the user.

A method according to the invention will now be described with reference to FIG. 3.

In step S3-1, the first server apparatus 14 provides the computing apparatus 10 with web page information. The provision of the web page information may be in response to a request received from the computing apparatus 10 following receipt at the computing apparatus 10 of a user input.

In step S3-2, the computing apparatus 10 receives and displays the web page information. In this example, the web page information comprises a "Login" page 110. The "Login" page 110 is as described with reference to FIG. 2 and comprises the encoded information item 312, which is in this example is a graphical object (GO), in particular a "quick response" (QR) code.

The GO 312 comprises a GO address information item. The GO address information item comprises an address of the computer apparatus 10 on or by which the GO 312 is displayed. The GO address information item may comprise a code, for example a numeric code or an alpha-numeric code, which identifies a route or a number of routes to the computer apparatus 10. Examples of such codes are an IP address, a telephone number, a domain name and a Blackberry® PIN.

According to other embodiments, the GO address information item may not comprise address information per se, but may instead comprise information which allows the address of the apparatus on or by which the GO 312 is displayed to be determined. This may include for example a code or number, such as but not limited to a hardware serial number, which can be used to determine the route to the computing apparatus (e.g. the IP address) from a look-up table.

The GO 312 may also comprise a first server identification (FSID) information item allowing the mobile device to identify the first server apparatus 14 with which the GO 312 is associated. The FSID information item may comprise an address of the first server apparatus 14 or may instead comprise a data item which allows the application stored on the mobile device 12 to retrieve the address of the first server apparatus 14 from memory 122.

The GO 312 may also comprise a verification information item for allowing verification of the graphical object to ensure it is not a fraud.

The information required to display the GO 312 may be generated entirely by the first server apparatus 14. Alternatively, part of the information of the GO 312, such as the SSID and the FSID information items, may be generated by the first server apparatus 14, and other information, such as the GO address information item, may be generated by the computing apparatus 10. The verification information item or items are generated by the first server apparatus 14 and a copy of the verification item or items is retained in the memory 142 of the first server apparatus 14.

According to some embodiments, the GO 312 may be displayed by computer program code embedded within the web page. Alternatively, the GO 312 may be displayed by computer program code stored on the computing apparatus 10, for example, during a registration process. The computer program code that is stored on the computer apparatus 10, and which generates the GO 312, may, when executed by the controller 20, be in direct communication with the first server apparatus 14. The computer program code may be configured such that the GO 312 is only displayed if the direct communication with the first server apparatus 14 can be established. This may be determined in any suitable way, for example as described with reference to FIG. 2 in respect of the second server apparatus 16.

In step S3-3, the GO 312 is obtained by the mobile device 12. This may involve the user of the device 12 taking a photograph of the GO 312 with a camera of the device 12. Alternatively, any other type of scanner may be used to obtain the GO 312.

In step S3-4, an application decodes the encoded information from the obtained GO 312. The application is a dedicated portion of the computer-readable code 122A stored in the memory 122, which is able to decode the GO 312 and perform subsequent operations.

The application may have been stored on the mobile device 12 prior to, during or following a registration process between the mobile device 12 and the first server apparatus 14. Either way, the user of the device 12 must register with the first server apparatus 14 to allow the user to utilise the service provided by the first server apparatus 14. Registration with the first server apparatus is as described with reference to FIG. 2.

In step S3-5, subsequent to decoding the obtained GO 312, the application prepares and transmits a first message 314 to the first server apparatus 14.

The first message 314 is sent to the first server apparatus 14 using an address of the first server apparatus 14. The application may be configured to interoperate with just one first server apparatus 14 and thus whenever a GO 312 is obtained, the first message 314 is sent to the same first server apparatus 14 using an address stored in the memory 122. Alternatively, in embodiments in which the GO 312 includes an FSID information item, this may be used to send the first message 314 (either directly, when the FSID information item comprises an address of the first server information item, or indirectly by using the FSID information item to retrieve the address from memory 122). In other alternative embodiments, the first message may be sent to an address selected by the user from a plurality of addresses stored on the device 12.

The first message 314 comprises a first information portion comprising the DID information item or the UID information item. The first message 314 also comprises a second information portion comprising the GO address information item.

The first message may also comprise a verification information item. Alternatively, the application may, prior to preparing and sending the first message 314, check the verification information item against a reference information item received from the first server apparatus 14 to determine whether the GO 312 is genuine. If the GO 112 is determined not to be genuine, the application alerts the user of the device 12.

If the GO 312 is determined to be genuine, the application prepares and transmits the first message 314 to the server apparatus 14.

Prior to preparing and sending the first message 314, the application may request security information to be provided by the user via the user interface 124 of the device 12, thereby to allow the identity of the user to be verified. The security information may comprise a pin or password, a disguised pin or password, a one-time code which has been sent to the user, a pattern drawn on the device, biometric information (such as face or fingerprint recognition), or any other suitable mechanism by which the identity of the user of the device can be verified.

Next, in step S3-6, the first server apparatus 14 receives the first message 314 and uses the UID or DID information item to establish the identity of the user of the device 12. Establishing the identity of the user comprises using UID or DID information item to determine whether the user is registered with the first server apparatus 14. Thus, the first server apparatus 14 may check the UID or DID information against information stored in a database of registered users to establish the identity of the user. Subsequent to establishing the identity of the user, the first server apparatus proceeds to step S3-7.

In embodiments in which the first message 314 includes the verification information item, the first server apparatus 14 may, prior to either of steps S3-6 and S3-7, check the verification information item against a reference information item stored in memory 142. If there is identity between the reference information item and the verification item, the first server apparatus proceeds to step S3-6 or S3-7 as appropriate. If there is not identity, the first server may send a message to the mobile device 12 to alert the user that the GO 312 is not genuine and may abort the method.

In step S3-7, the first server apparatus 14, subsequent to establishing the identity of the user, performs an action. In this example, as the first server apparatus 14 is a web server, the first server apparatus 14 logs the user into their account. The first server apparatus 14 uses the GO address information item to send a signal indicative of such to the computing apparatus. In this example, the GO address information comprises the IP address of the computing apparatus 10 and so the first server apparatus 16 transmits information indicative of the user having been logged into their account to the computing apparatus 10.

In step S3-9, the computing apparatus 10 displays the received information which indicates that the user is now logged into the web page.

According to some embodiments, step S3-6 in which the first server apparatus 14 establishes the identity of the user may include additional steps to verify the identity of the user. These steps may be those as described above with reference to step S2-6 of FIG. 2.

In the embodiments of FIGS. 2 and 3, the GO 112, 312 is displayed in conjunction with the fields into which a username and password can be entered. However, it will be appreciated that the GO 112, 312 alternatively may be displayed instead of the username and password fields. Also, although in the embodiments described with reference to FIGS. 2 and 3, the GO 112, 312 is used instead of a username and password to log the user into the web page, it will be understood the GO 112, 312 could be used in conjunction with a conventional login procedure using the username and password fields. This adds an extra layer of security both for the web server and the user.

It will be understood that the invention may be implemented within systems other that than those described above. Such implementations are described in brief below. Although these are described briefly, it will be understood that the operations may be substantially the same as those described above and may include the some or all of the same steps and features.

According to one alternative embodiment, the invention can be implemented in a building security system. In such an embodiment, the computing apparatus 10 may comprise an electronic door lock. The encoded information item 112, 312, such as a GO as described above, may be displayed on a sign geographically proximate to the electronic door lock. Alternatively, the GO 112, 312 may be provided on an electronic display geographically proximate to the electronic door lock. In such embodiments, the encoded information item may be periodically updated following receipt of signals from the first server apparatus 14 (or from the second server apparatus 16 if the system is as shown in FIG. 2). The GO 112, 312 includes a GO address information allowing the electronic door look to be identified. The encoded information item 112, 312 may also include an FSID information item as described above. Upon approaching the door, a user uses their mobile device 12 to obtain and decode the encoded information item 112, 312. Subsequently, optionally following the successful provision of security information by the user to the mobile device, a first message 214, 314 (including the GO address information object and the UID or DID information item) is sent to the first server apparatus 14. In this example, the first message 214, 314 comprises an "entry request". In response to receiving the entry request 214, 314, the first server apparatus 14 establishes the identity of the user using the UID or DID information item. Next, if the system does not comprise the second server apparatus, the first server apparatus 14 transmits a signal to the electronic door lock (using the GO address information item) authorising the electronic door look to open and thereby to allow the user to pass through the door. Alternatively, if the system does comprise the second server apparatus 16, the first server apparatus 14 transmits the second message 216 (including authorisation information indicating that the user is authorised to enter the door) to the second server apparatus 16 which responds by transmitting a signal to the electronic door lock (using the GO address information item), authorising the electronic door lock to open.

According to another alternative embodiment, the invention may be implemented so as to enable a shopper to pay for their goods at a checkout device. In this embodiment, the computing apparatus 10 is a checkout device. Once the goods to be purchased have been scanned through the checkout device, the checkout device 10 produces and displays an encoded information item 112, 312, in this example a GO. The GO 112, 312 comprises a GO address information item (as described above) which allows the checkout device to be identified, and a total price that is to be paid. The GO may also comprise an information item identifying (or allowing identification by the application of) a banking establishment to which the monies are to be paid. Optionally, following provision by the user of security information to the mobile device 12, the application of the mobile device 12 transmits the first message 214, 314 (a payment request) to the first server apparatus 14. The payment request 214, 312 includes the GO address information item, the UID or DID information item (as described previously), the price information and the information item identifying the payee banking establishment. The identity of the user is established by the first server apparatus 14 using the UID or DID information item. In response to establishing the identity of the user, the first server apparatus 14, which, for example, may be associated with a banking establishment, authorises payment from the user's account to the payee banking establishment of an amount identified by the price information. Next, if the system does not comprise the second server apparatus, the first server apparatus 14 transmits (using the GO address information item) a signal to the checkout device indicating that the balance has been paid. Alternatively, if the system does comprise the second server apparatus 16, the first server apparatus 14 transmits the second message 216 (indicating that the user is authorised to make this payment) to the second server apparatus 16 (which may be associated with payee banking establishment) which responds by transmitting the signal to the checkout device (using the GO address information item) indicating that the balance has been paid.

According to another alternative embodiment, the invention may be implemented within an ATM system. In this embodiment, the computing apparatus 10 is an ATM. The user requests withdrawal of an amount of money from the ATM. In response to this the ATM produces and displays an encoded information item 112, 312, in this example a GO. The GO 112, 312 comprises a GO address information item to allow the ATM to be identified and information indicating the withdrawal amount. The GO 112 may also comprise a SSID information item. Following provision of security information, such as a pin etc., to the mobile device 12 by the user, the application of the mobile device 12 transmits the first message 214 (a withdrawal request) to the first server apparatus 14. The withdrawal request 214 includes the GO address information item, the UID or DID information item identifying the device or the user, the withdrawal amount information and if applicable the SSID information item. The identity of the user is established by the first server apparatus 14 using the UID or DID information item, and in response to establishing the identity of the user, the first server apparatus 14, which in this example is associated with the a banking establishment, authorises the withdrawal and debits the user's account by the amount indicated by the withdrawal amount information. Next, if the system does not comprise the second server apparatus 16, the first server apparatus 14 transmits (using the GO address information item) a signal to the ATM authorising the ATM to dispense the requested amount. Alternatively, if the system does comprise the second server apparatus 16, the first server apparatus 14 transmits (using the SSID information item) the second message 216 to the second server apparatus 16 (which may be associated with a banking establishment that owns the ATM, if this is not the same as the user's banking establishment) which responds transmits the signal (using the GO address information item) to the ATM authorising the ATM to dispense the requested amount.

According to another alternative embodiment, the invention can be implemented in a self-service shopping environment. In such an embodiment, an encoded information item 112, in this example a GO, may be provided on a smart tag of a product for sale. The user obtains the GO 112 using their mobile device 14. In this embodiment, the GO 112, 312 contains the GO address information item for allowing the smart tag to be identified (as described above) and a price of the product. The GO 112, 312 may also comprise an information item identifying (or allowing identification by the application of) a banking establishment to which the monies are to be paid. Optionally following provision by the user of security information to the mobile device 12, the application of the mobile device transmits the first message 214 (a purchase request) which includes the GO address information item, the UID or DID information item and the price information to the first server apparatus. The identity of the user is then established by the first server apparatus 14 using the UID or DID and in response to establishing the identity of the user, the first server apparatus 14 authorises payment for an amount identified by the price information. Next, the first server apparatus 14 transmits the second message 216 to the second server apparatus 16, which may be an in-store security system. The second message 216 comprises the GO address information item and authorisation information indicating that the product has been paid for. In response to receiving the second message 216, the second server apparatus uses the GO address information item to transmit a signal to the smart tag thereby to disable it, such that an alarm is not activated when the user attempts to leave the shop).

Although in the above embodiments the encoded information item 112, 312 has been described as a graphical object, it will be understood that this may instead be a different type of encoded information item. These may include, for example, an encoded audible information item, which may be emitted by the computing apparatus 10 and recorded and decoded by the mobile device 12. Other types of encoded information item include encoded radio frequency (RF) information items.

In some embodiments, the encoded information item 112, 312 may comprise a sequence of numbers, letters or symbols. In such embodiments, the device 12 may obtain the encoded information item as a result of the user manually typing the sequence into the device using the user interface 126. In other alternative embodiments, the encoded information item may be obtained via a wired connection between the device 12 and the computing apparatus 10.

In some embodiments, the encoded information item 112, 312 may be changed periodically, for example, by updating the verification item. In such embodiments, when the verification item is not created by the same entity that is responsible for checking it, the verification item is transmitted to the checking entity each time it is updated.

In the embodiments described above, the encoded information object 312, 112 is decoded by the device prior to sending the first message 214 to the first server apparatus 14. However, in alternative embodiments the encoded information item 112, 312 may be transmitted in the first message 214 for decoding by the first server apparatus 14. In such embodiments, the device 12 has pre-stored the address of the first server apparatus. The application may be configured to send the first message 214 to that address when each time encoded information item 112, 312 is obtained. Alternatively, the user may select the address to which the first message 214 is to be sent from a plurality of addresses stored in the device 12. In these embodiments in which the first message includes the encoded information item, it will be appreciated that, where the encoded information item includes a verification item, this will be verified by the first server apparatus 14 and not by the device 12.

In FIGS. 2 and 3, the mobile device 12 is depicted as a mobile telephone. However, it will be appreciated that it may be any other type of device comprising obtaining means 124 for obtaining an encoded information item in one or more of the aforementioned manners. The obtaining means 124 may comprise, for example, a physical interface for receiving from the computing apparatus 10 an encoded information item in the form of a computer-readable electrical signal, an RF transceiver for receiving an RF encoded information item as an RF signal, or an audio receiver for obtaining audible encoded data items.

The mobile device 12 is depicted in FIG. 1 as a single unit. However, it will be appreciated that it may instead comprise plural separate units, for example a webcam and a laptop computer.

The invention provides a new and inventive way of providing secure access to services. The provision of the encoded information item reduces the possibility of a so-called "man-in-the-middle attack". The invention is particularly effective in this respect in embodiments in which the computer program code for generating the encoded information item is stored on the computer apparatus 10 and is configured such that the encoded information item is only provided (i.e. displayed, emitted, output etc.) when direct communication with an application running on the web server 14; 16 is established. This is because, if a proxy server is placed between the computer apparatus 10 and the web server 14; 16 for intercepting communications between the two, direct communication between the computer program code running on the computer apparatus 10 and the application running on the web server can not be established and so the encoded information item will not be provided. Thus, the user is unable access the service and so cannot divulge sensitive information to the fraudster operating the proxy server.

The use of a verification item by which the first server apparatus can verify the encoded data item, which may be changed periodically, reduces the chance of fraudsters being able to clone the encoded information item and thereby to clone service in order to elicit information illegally from a user. Moreover, the use of a mechanism according to the invention reduces the amount of personal information (such as usernames and passwords) that is required to be entered to the computing apparatus 10, the security of which may be compromised through the presence of viruses and the like.

The invention also allows for an expedited the log-in process as the user may not need to spend time entering password and username information. Similarly, the invention may remove the need for users to remember many passwords to many different services etc.

In some embodiments of the invention, in which the encoded information item need to be obtained and a password needs to be entered, an additional layer of security is introduced and so the system is safer for the users.

The invention also allows for tiered strengths of authentication to be applied based on risk, transaction value and/or user profile. For example for some websites simply being in possession of the mobile device 12 and obtaining the encoded data item may be sufficient to allow the user to access the services provided by the website. For other implementations such as payment and banking implementations, a more comprehensive collection of authenticating factors (for example, possession of the device and knowledge of a password) may be employed. If the device 12 is lost or stolen, the network provider (if the device is a mobile telephone) may disable the device, thereby preventing the thief or finder of the device being able to use the device and the application stored thereon to access the user's websites and services to which they are subscribed etc. Alternatively, the user may contact the owner or maintainer of the first service apparatus to instruct them to ensure that any requests from the lost or stolen device be denied. A new device subsequently can be associated with the user's registration at the first server apparatus 14.

In some embodiments of the invention, it may only be permitted for the user to register their device with the first server 14 if they have a monthly contract with a mobile telephone network provider. Such contracts (as opposed to so-called "pay-as-you-go" tariffs) involve a stringent identification process, including the user providing proof of address and bank details etc. Therefore, for services for which security is important, such as banking and the like, it may only be possible to register to log in by way of the encoded information item if the user has a pay monthly contract and so their identity is known with more certainty.

Security advantages are achieved by using a separate device (i.e. the mobile device 12 and not the computer apparatus 10 with which the service is being accessed) to communicate with the server apparatus 14 which is configured to establish the identity of the user (see steps S2-6 and S3-6 of FIGS. 2 and 3 respectively). By taking the authentication process "out-of-band" in this way, the complexity of the system is increased. It is significantly more difficult and costly for a fraudster to detect, intercept or compromise the multiple communication channels (bands) and/or server apparatuses involved. Thus, the system is more secure.

It should be realised that the foregoing embodiments are not limiting. Other variations and modifications will be apparent to persons skilled in the art upon reading the present application. Moreover, the disclosure of the present application should be understood to include any novel features or any novel combination of features either explicitly or implicitly disclosed herein or any generalisation thereof and during the prosecution of the present application or of any application derived therefrom, new claims may be formulated to cover any such features and/or combination of such features.

The invention claimed is:

1. A method comprising:
    a portable device:
        obtaining a graphical encoded information item which is displayed on a sign proximate to a computing apparatus;
        decoding the encoded information from the encoded information item; and
        transmitting a first message to first server apparatus, the first message including the decoded information and a first identifier identifying the device or a user of the device, wherein the decoded information includes an apparatus identification information item for allowing identification of the computing apparatus,
    the first server apparatus:
        receiving the first message from the device;
        establishing the identity of the user of the device, wherein establishing the identity of the user comprises using the first identifier to determine if the user is registered with the first server apparatus;
        in response to establishing the identity of the user, authorising the user to access a service; and:
        using the apparatus identification information item to transmit a signal to the computing apparatus, and
    the computing apparatus providing the service to the user.

2. The method of claim 1, wherein the decoded information comprises a verification information item, the method further comprising the first server apparatus:
    comparing the verification information item with a reference verification item;
    if there is identity between the verification information item and the reference verification item, providing the service to the user via the computing apparatus using the apparatus identification information item; and
    if there is not identity between the verification information item and the reference verification item, aborting the method prior to providing the service to the user via the computing apparatus using the apparatus identification information item.

3. The method of claim 1, wherein the encoded information comprises a third identifier, the third identifier identifying the first server apparatus, and wherein the first message is transmitted to the first server apparatus based on the third identifier.

4. The method of claim 1, comprising:
    the portable device:
        prior to transmitting the first message, receiving a user input;
        comparing the received user input to a stored reference input; and
        transmitting the first message, when it is determined that there is identity between the received user input and the stored reference user input.

5. The method of claim 1, wherein establishing the identity of the user of the device comprises:
    initiating a communication channel with the device based on the first identifier;
    receiving user-provided information from the device via the communication channel;
    comparing the received user-provided information with stored reference user-provided information; and
    verifying, and thereby establishing, the identity of the user when it is determined that there is identity between the received user-provided information and the reference user-provided information.

6. A method comprising:
    a portable device:
        obtaining a graphical encoded information item which is displayed on a sign proximate to a computing apparatus; and
        transmitting a first message to first server apparatus, the first message including the encoded information item and a first identifier identifying the device or a user of the device,
    the first server apparatus:
        receiving the first message from the device;
        decoding the encoded information from the encoded information item, wherein the decoded information includes an apparatus identification information item for allowing identification of the computing apparatus;
        establishing the identity of the user of the device, wherein establishing the identity of the user comprises using the first identifier to determine if the user is registered with the first server apparatus; and
        in response to establishing the identity of the user, authorising the user to access a service; and:
        using the apparatus identification information item to transmit a signal to the computing apparatus, and
    the computing apparatus providing the service to the user.

7. The method of claim 6, wherein the decoded information comprises a verification information item, the method further comprising the first server apparatus:
    comparing the verification information item with a reference verification item;
    if there is identity between the verification information item and the reference verification item, providing the service to the user via the computing apparatus using the apparatus identification information item; and
    if there is not identity between the verification information item and the reference verification item, aborting the method prior to providing the service to the user via the computing apparatus using the apparatus identification information item.

8. The method of claim 6, comprising:
    the portable device:
        prior to transmitting the first message, receiving a user input;
        comparing the received user input to a stored reference input; and
        transmitting the first message, when it is determined that there is identity between the received user input and the stored reference user input.

9. The method of claim 6, wherein establishing the identity of the user of the device comprises:
    initiating a communication channel with the device based on the first identifier;
    receiving user-provided information from the device via the communication channel;
    comparing the received user-provided information with stored reference user-provided information; and
    verifying, and thereby establishing, the identity of the user when it is determined that there is identity between the received user-provided information and the reference user-provided information.

10. A system comprising:
    a portable device configured:

to obtain an graphical encoded information item which is displayed on a sign proximate to a computing apparatus;

to decode the encoded information from the encoded information item; and to transmit a first message to first server apparatus, the first message including the decoded information and a first identifier identifying the device or a user of the device, wherein the decoded information includes an apparatus identification information item for allowing identification of the computing apparatus;

first server apparatus configured:

to receive the first message from the device;

to establish the identity of the user of the device, wherein establishing the identity of the user comprises using the first identifier to determine if the user is registered with the first server apparatus;

in response to establishing the identity of the user, to authorise the user to access a service; and to use the apparatus identification information item to transmit a signal to the computing apparatus, and the computing apparatus configured to provide the service to the user.

11. The system of claim 10, wherein the decoded information comprises a verification information item, the first server apparatus being configured:

to compare the verification information item with a reference verification item;

if there is identity between the verification information item and the reference verification item, to provide the service to the user via the computing apparatus using the apparatus identification information item; and if there is not identity between the verification information item and the reference verification item, to abort prior to providing service to the user via the computing apparatus using the apparatus identification information item.

12. The system of claim 10, wherein the encoded information comprises a third identifier, the third identifier identifying the first server apparatus, and wherein the device is configured to transmit the first message to the first server apparatus based on the third identifier.

13. The system of claim 10, wherein the device is configured:

prior to transmitting the first message, to receive a user input;

to compare the received user input to a stored reference input; and to transmit the first message, when it is determined that there is identity between the received user input and the stored reference user input.

14. The system of claim 10, wherein the first server apparatus being configured to establish the identity of the user of the device comprises the first server apparatus being configured:

to initiate a communication channel with the device based on the first identifier;

to receive a user-provided information from the device via the communication channel;

to compare the received user-provided information with stored reference user-provided information; and to verify, and thereby to establish, the identity of the user when it is determined that there is identity between the received user-provided information and the reference user-provided information.

* * * * *